US007494418B2

(12) United States Patent
Rifkin et al.

(10) Patent No.: US 7,494,418 B2
(45) Date of Patent: Feb. 24, 2009

(54) GAMING MACHINE WITH HINGED TOP BOX

(75) Inventors: David Rifkin, Little Egg Harbor, NJ (US); Walter E. Smolucha, Melrose Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 468 days.

(21) Appl. No.: 11/140,674

(22) Filed: May 27, 2005

(65) Prior Publication Data

US 2006/0281558 A1 Dec. 14, 2006

(51) Int. Cl.
*A63F 13/00* (2006.01)

(52) U.S. Cl. ........................................................ 463/46

(58) Field of Classification Search ............. 463/46–47; 200/61.69, 61.7, 61.81, 61.82; 439/376, 439/341

See application file for complete search history.

(56) References Cited

U.S. PATENT DOCUMENTS 3,838,234 A * 9/1974 Peterson .................... 200/61.7
4,647,043 A * 3/1987 Wiczer ................... 273/121 R
4,865,322 A * 9/1989 Krutsch .................. 273/121 R
5,110,120 A 5/1992 Smolucha ................... 273/121
5,304,077 A * 4/1994 Provenzale ................. 439/347
5,476,392 A * 12/1995 Inaba et al. ................. 439/376
5,666,264 A * 9/1997 Chandler et al. ............ 361/683
5,830,018 A * 11/1998 Simmel ...................... 439/660
6,070,996 A * 6/2000 McCollum .................. 362/431
6,083,027 A * 7/2000 Sato ........................... 439/341
6,350,141 B1 * 2/2002 Houtz ........................ 439/341
6,368,216 B1 4/2002 Hedrick et al. ................ 463/20
6,506,065 B1 * 1/2003 Castleman .................. 439/157
2004/0092317 A1 * 5/2004 Beirne ......................... 463/46
2005/0054449 A1 * 3/2005 Kopera et al. ................. 463/46
2005/0191890 A1 * 9/2005 Taylor et al. ................ 439/342
2006/0223369 A1 * 10/2006 Zheng ........................ 439/607

* cited by examiner

*Primary Examiner*—John M. Hotaling, II
(74) *Attorney, Agent, or Firm*—Nixon Peabody LLP

(57) ABSTRACT

A gaming machine for conducting a wagering game includes a base and a top box connected to the base by a pair of hinges that rotate in fixed stops between full upright and full down positions. The hinges are mounted to respective plates in the base and top box having sufficient thickness and strength to support the weight of the top box without binding. Blind-mate connectors are disposed within the plates such that when the top box is tilted from the full down to full upright positions, electrical connections between the top box and base are established. Likewise, when the top box is tiled to the full down position, the electrical connections are broken as the connectors separate. A retractable support member secured to the rear of the base has an extendable member that is secured to the top box when installed on the base in the full upright position.

18 Claims, 11 Drawing Sheets

GAMING MACHINE WITH HINGED TOP BOX

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and more particularly, to a gaming machine having a hinged top box.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Another enhancement to gaming machines includes a top box being mounted to the base portion of a gaming machine. The top box may comprise a second display, lights, animations, or other features designed to attract players to the machine. Top boxes are particularly popular with "slant-top" gaming machines, which have a display that slants in the direction of a player at an angle of approximately thirty degrees. A slant-top machine having a top box is often taller than an average player and is generally substantially larger and heavier than other gaming machines. In many slant-top machines, parts may be replaced from the top box to facilitate theme changes and conversions in the machine. One example of a slant-top machine is the Bluebird™ machine, manufactured by WMS® Gaming.

Currently, shipping and installing gaming machines with top boxes suffer from numerous drawbacks. Shipping the gaming machine with the top box separated from the base is disadvantageous because the considerable weight of the top box requires two or more operators to lift and install the heavy and cumbersome top box over the base unit, risking serious injury. This risk is aggravated because the operators must take care to ensure that the top box and the base unit are aligned properly, requiring lifting and re-lifting the top box. Moreover, when the top boxes and base units are delivered separately, the operator must manually match up the serial number of the top box to the serial number of the base portion. Additionally, the operator can be confused about whether a particular base unit is to be installed with a top box. Thus, a significant amount of manpower and time is required to install or convert a top box.

Thus, a need exists for an improved gaming machine. The present invention is directed to satisfying one or more of these needs and solving other problems.

SUMMARY OF THE INVENTION

According to one aspect of the present invention, a gaming machine for conducting a wagering game includes a base assembly including a primary display, which can be of the slant-top type, and a top box assembly including a top box display. The top box assembly is attached to the base assembly by a hinge whose movement between a closed position and an open position causes electrical connections between the top box assembly and the base assembly to be respectively established or broken. In an embodiment, the hinge is attached between a base plate of the base assembly and a top box plate of the top box assembly.

In a further embodiment, the base assembly includes a first connector and the top box assembly includes a second connector, and the first and second connectors can be of the blind-mate type. The first connector matingly engages the second connector when the hinge is in said closed position to carry electrical signals between the base assembly and the top box assembly. The first connector electrically disengages the second connector when the hinge is in said open position.

In another embodiment, the gaming machine includes a retractable support assembly attached to a rear portion of the base assembly. The retractable support assembly has a retractable member that is retractably extendable relative to the top box assembly.

In still another embodiment, the top box assembly is movable in fixed stops about the hinge relative to the base assembly among a plurality of positions, including the open position, the closed position, and a third position, such as fully open or a position between fully open and closed. The gaming machine can include means for holding the top box assembly in the third position.

According to another aspect of the invention, a method of installing a top box assembly of a gaming machine includes rotating in a first direction the top box assembly about a hinge that hingedly couples the top box assembly to a base assembly such that a first connector in the top box assembly establishes an electrical connection between the top box assembly and the base assembly with a corresponding second connector in the base assembly.

In a further embodiment, the method also includes rotating in a direction opposite the first direction the top box assembly about the hinge such that the first connector breaks the electrical connection between the top box assembly and the base assembly. In another embodiment, the method further includes extending a retractable support member attached to the base assembly and securing the retractable support member to the top box assembly in a closed position in which the electrical connection is established. In still another embodiment, the method includes holding the top box assembly in fixed positions about the hinge.

Additional aspects of the invention will be apparent to those of ordinary skill in the art in view of the detailed description of various embodiments, which is made with reference to the drawings, a brief description of which is provided below.

DETAILED DESCRIPTION

Figure 1:
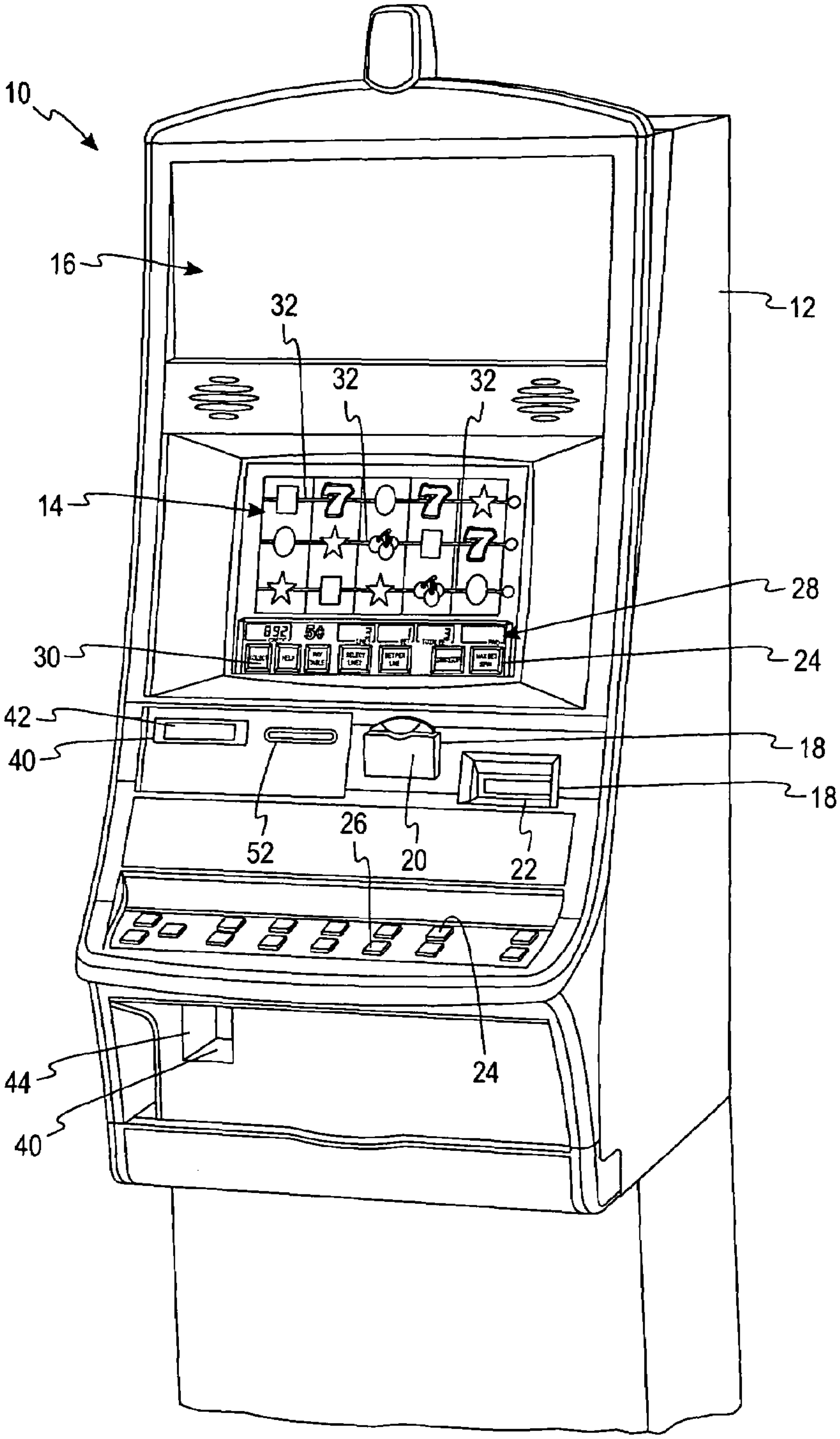
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel.

The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual associated to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
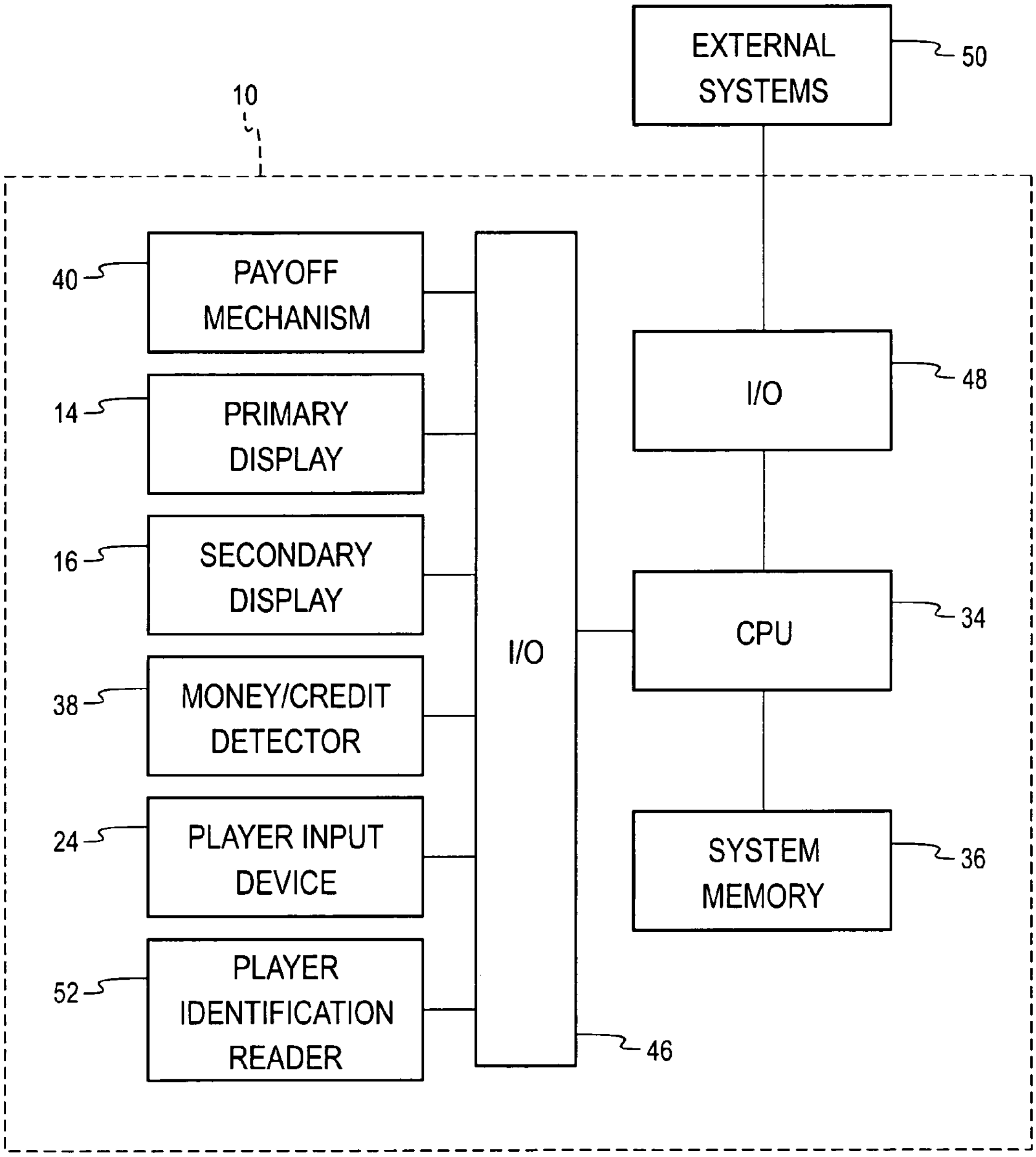
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
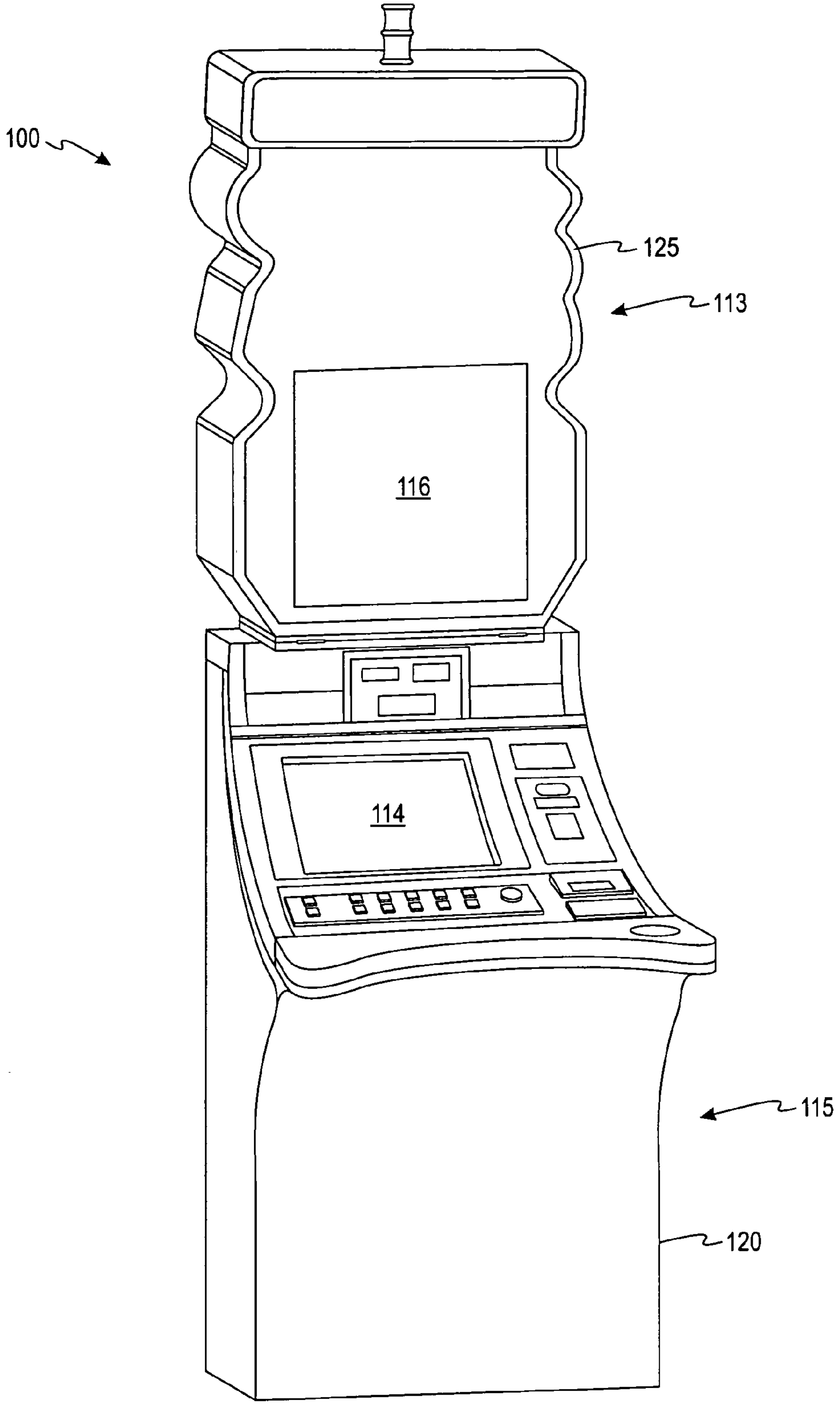
FIG. 3 is a perspective front view of a slant-top gaming machine with a top box assembly mounted to a base assembly of the slant-top gaming machine according to the present invention.

Turning now to FIG. 3, a perspective view of a slant-top gaming machine 100 having a base assembly 115 and a top box assembly 113 is shown. The base assembly 115 includes a primary display 114 and a base housing or cabinet 120, and the top box assembly 113 includes a top box display 116 that is housed within a top box housing or cabinet 125. The slant-top gaming machine 100 generally has the same components of the gaming machine 10 and generally operates in the same manner as described above in connection with FIGS. 1 and 2. The primary display 114 of the slant-top gaming machine 100 is slanted at approximately a thirty-degree angle toward a player. Although in the illustrated embodiment, the gaming machine 100 is a slant-top gaming machine, in other embodiments, it is an upright gaming machine such as shown in FIG. 1.

The top box assembly 113 includes a top box plate 118 to which the top box housing 125 is attached. Similarly, the base assembly 115 includes a base plate 119 to which the base housing 120 is attached. Hinges 127*a,b* couple the top box plate 118 to the base plate 119. The base plate 119 has a thickness of approximately 0.25 in. to 0.50 in. and is made of steel or other metal. The thickness is partly a function of the weight of the top box, and sufficient thickness is required to prevent binding as the top box assembly 113 is rotated about the hinges 127*a,b*. The hinges 127*a,b* can be recessed so that they remain hidden from the player when the top box assembly 113 is installed on the base assembly 115. Although a pair of hinges 127*a,b* are shown, in other embodiments, a single hinge, such as a continuous or piano hinge, running along the length of the base and top box assemblies is employed.

Figure 4:
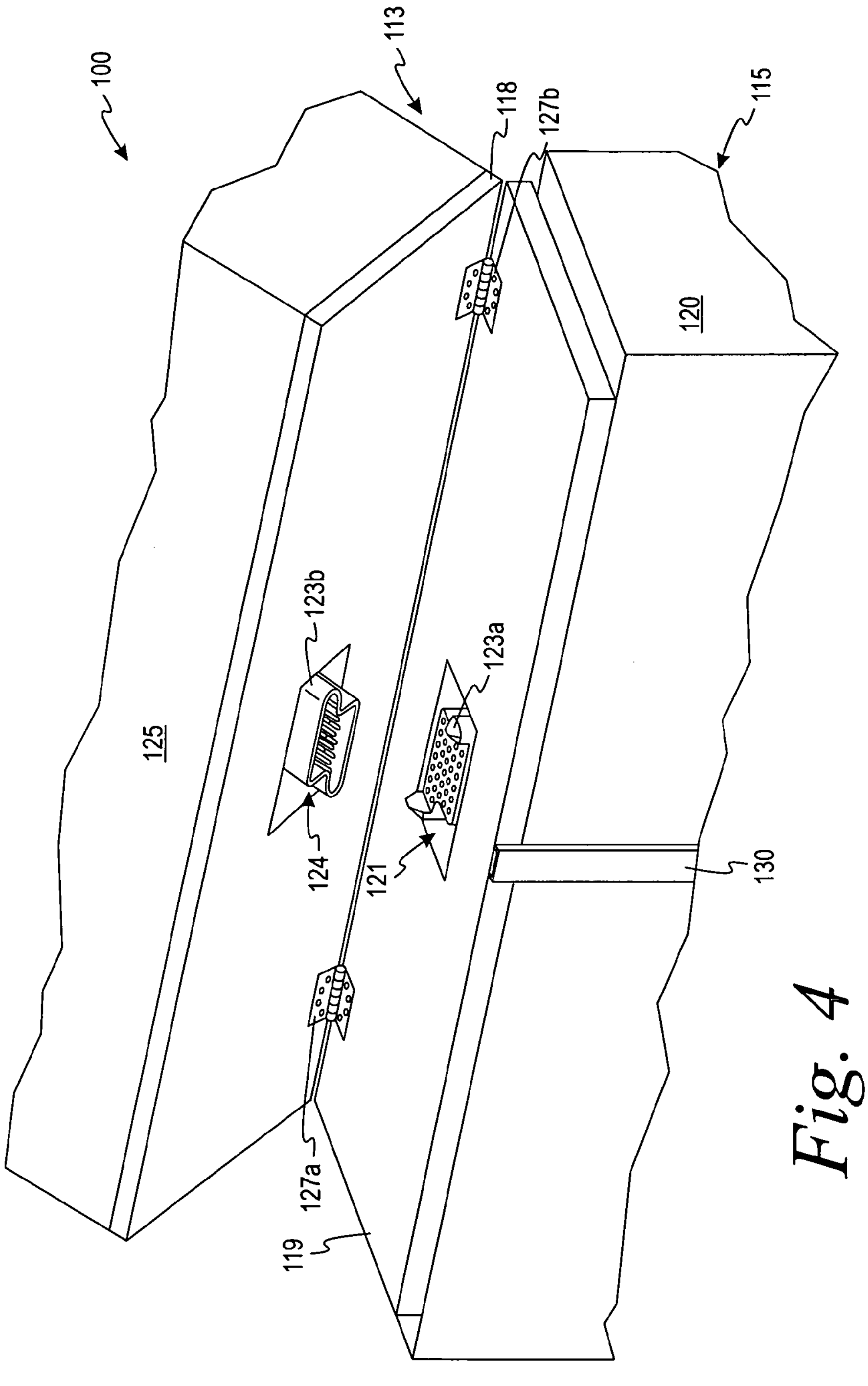
FIG. 4 is a perspective rear view of part of the gaming machine shown in FIG. 3 with the top box assembly hingedly tilted relative to the base assembly according to the present invention.

FIG. 4 shows a perspective rear view of a portion of the gaming machine 100 in which the top box assembly 113 is in an open position relative to the base assembly 115. The base plate 119 has an opening 121 dimensioned to accept a connector 123*a*. Similarly, the top box plate 118 has an opening 124 dimensioned to accept a connector 123*b* that is aligned with the connector 123*a* such that they matingly engage one another when the hinges 127*a,b* are in a closed position. The connectors 123 may be Molex® connectors, blind-mate connectors, bow-plug connectors, or any other connectors suitable to make electrical connections between the base portion and the top box. As the hinges 127*a,b* are urged apart toward an open position, the connectors 123*a,b* electrically disengage, breaking any electrical connection established by the connectors 123*a,b* between the base assembly 115 and the top box assembly 113. The electrical disengagement of the connectors 123*a,b* as the hinges 127*a,b* are urged apart toward an open position advantageously prevents a risk of electrical shock or short-circuiting electronics within the gaming machine 100 when the top box assembly 113 is in an open position. The connectors 123*a,b* carry power and data signals between the top box assembly 113 and the base assembly 15 of the gaming machine 100 when the connectors 123*a,b* are engaged. The connector 123*a* is female type, and the connector 123*b* is male type. The connector 123*a* includes registration members to guide the connector 123*b* into an aligned, engaged position.

A retractable support member 130 is attached to the rear of the base housing 150 and removably attaches to the top box assembly 113 when the hinges 127*a,b* are in the closed position. The retractable support member 130 is shown in a retracted position in FIG. 4, and in a partially extended position in FIG. 6*a*. The retractable support member 130 includes an extension member 132 (shown in FIG. 6*a*) that extends out of the retractable support member 130 and is attached to the top box assembly 113 to prevent movement of the top box assembly 113 when it is installed on the base assembly 115.

Figure 6A:
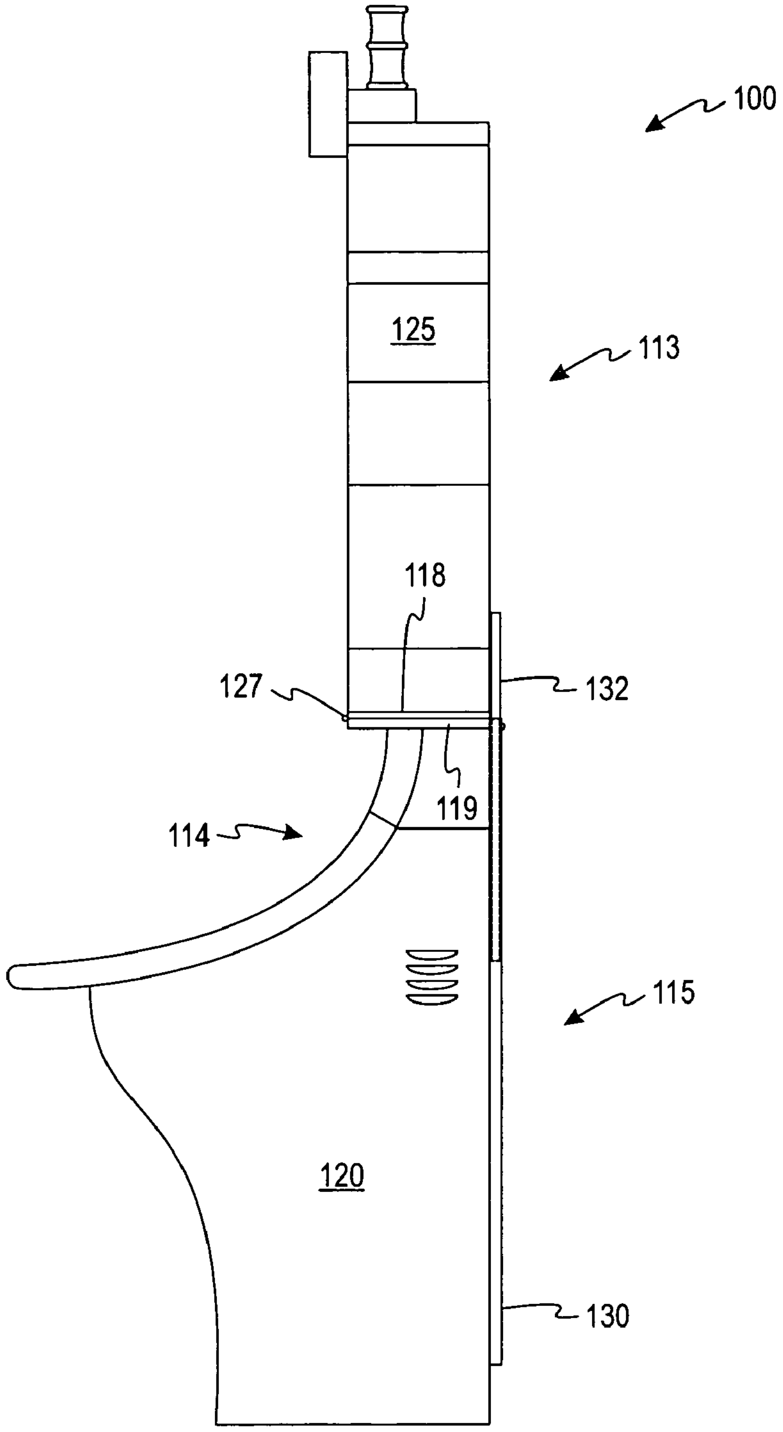
FIG. 6*a* is a side view of the slant-top gaming machine of FIG. 3 with the top box assembly installed in a full, upright (closed) position.

The hinges 127*a,b* are located at the front of the gaming machine 100, i.e., facing the player. Placing the hinges 127*a,b* at the front of the gaming machine 200 advantageously allows the top box to be tilted when the rear of the gaming machine 100 is positioned against a wall, as is regularly the case in a casino environment. The rear of the gaming machine 100 is thus generally inaccessible without moving the entire gaming machine 100. The present invention obviates the need for operators to move the gaming machine 100 away from the wall or to remove the gaming machine 100 from the casino floor entirely in order to service or convert the top box assembly 113. Servicing or top-box conversion can be performed quickly on-the-spot, for example, with minimal disruption to casino operations and with minimal physical risk to the operators. The hinged configuration of the present invention also advantageously facilitates installation of the gaming machine 100. The top box assembly 113 is already attached to the base assembly 115 when the gaming machine 100 is moved into place on the casino floor. Installation by a single operator is easily and rapidly accomplished by simply rotating the top box assembly 113 from a full open position (see FIG. 6*b*) to a full upright (or installed) position as shown in FIG. 6*a*. Electrical connections are established between the top box assembly 113 and the base assembly 115 without any manual connections being made by the operator. Risk of physical injury to operators is also substantially reduced because the heavy, cumbersome top box assembly 113 does not have to be lifted into place or removed from the base assembly 115.

In order to prevent binding at the hinges 127*a,b*, the hinge pivot points are extended a distance away the front edge of the base housing 120. The hinge pivot points of the hinges 127*a,b* are extended away from the base housing 120 by extending the width of the base plate by approximately 1.5 in. to 2.0 in. beyond the front edge of the base housing 120, as shown in FIGS. 3-6*b*.

The top box plate 118 is attached to the hinges 127*a,b* as shown in FIG. 4. The top box plate preferably has a thickness of about 0.25 in. to about 0.5 in. In other embodiments, the hinges 127*a,b* can be attached to a frame (not shown) of the top box assembly 113 or any other suitable part thereof instead of the top box plate 118. Likewise, the hinges 127*a,b* can be attached to a frame (not shown) of the base assembly 115 or any other suitable part thereof instead of the base plate 119.

The opening 124 of the top box plate 118 is positioned such that the connector 123*b* aligns with the connector 123*a* within the opening 121 of the base plate 119 (see FIG. 4) when the top box assembly 113 is installed in a full upright position relative to the base assembly 115. The alignment of the connectors 123*a,b* via the rotation of the hinges 127*a,b* electrically couples the top box assembly 113 and the base assembly 115 together without requiring any manual connections to be made. An advantage to this configuration is that the installing operator merely tilts the top box assembly 113 about the hinges 127*a,b* to the full upright position and secures the top box assembly 113 with the retractable support member 130. The connectors 123*a,b* automatically connect together and establish necessary electrical connections between the top box assembly 113 and the base assembly 115.

Figure 5A:
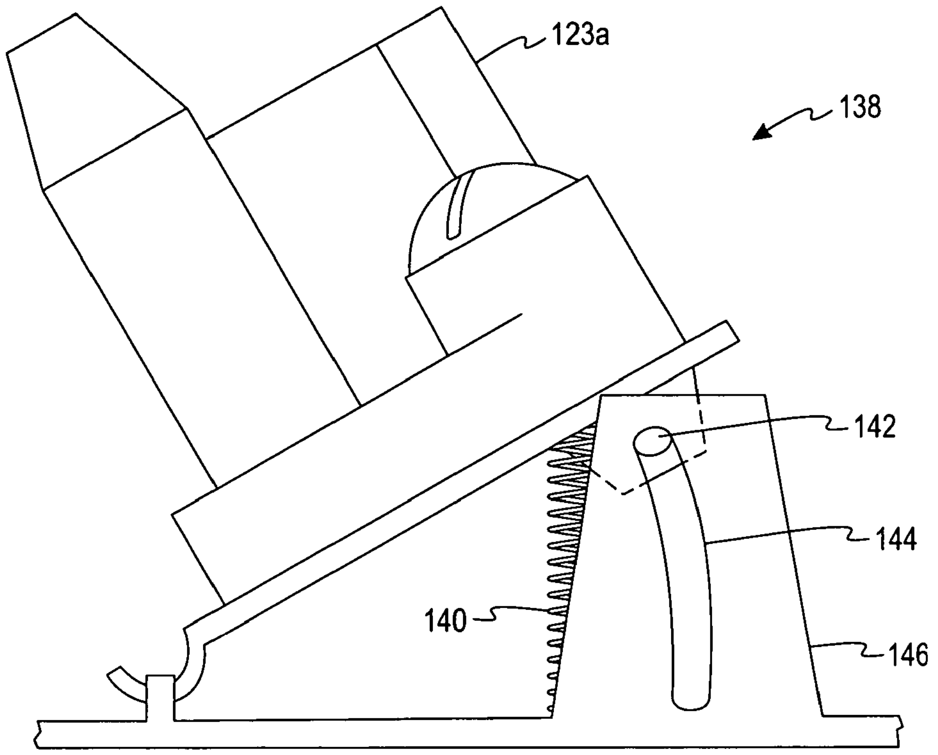
FIG. 5*a* is a side view of a connector assembly used in the gaming machine shown in FIG. 3.
Figure 5B:
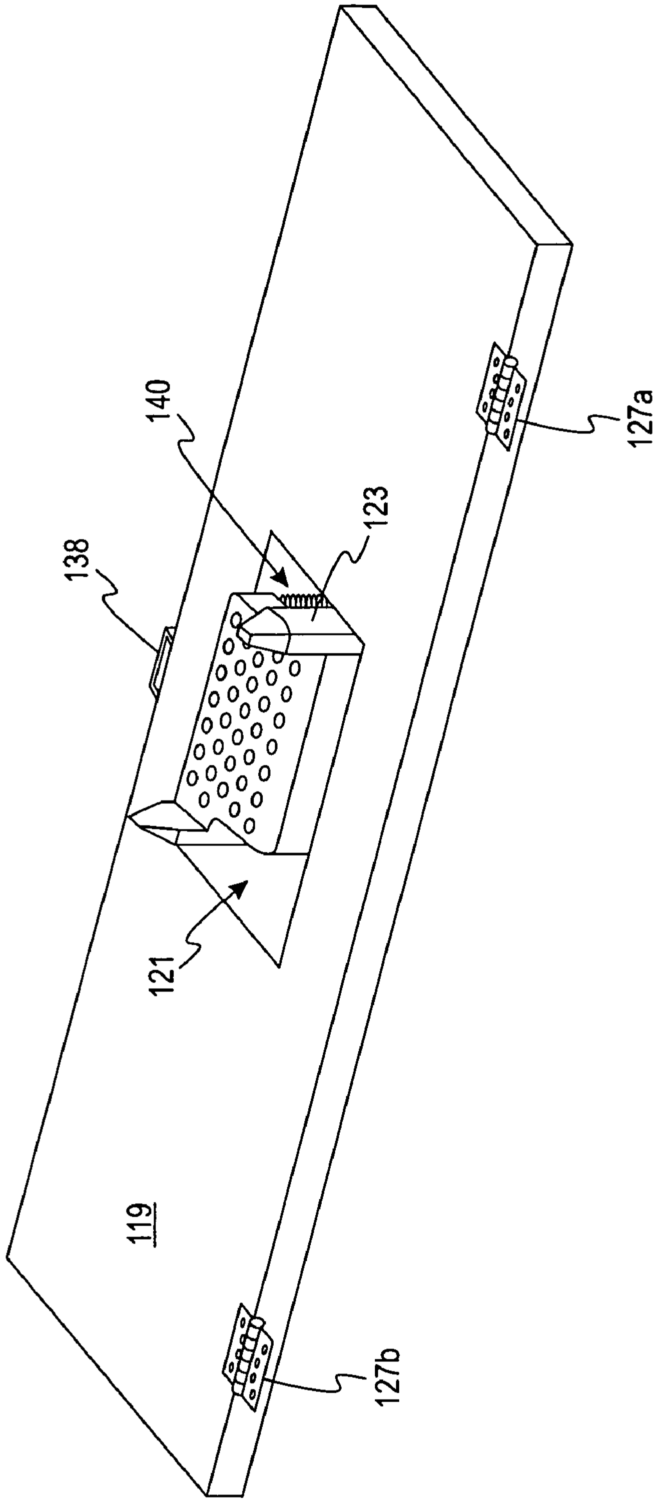
FIG. 5*b* is a perspective front view of part of the gaming machine shown in FIG. 3 with the connector assembly of FIG. 5*a* installed in the base assembly of the gaming machine.

FIG. 5*a* shows a side view of a connector assembly 138 that is used in the gaming machine 100. The connector assembly 138 includes the connector 123*a*, a spring 140 and a pin 142 that glides along the channel 144 formed in a base portion 146 of the connector assembly 138. The spring 140 causes the pin 142 to be held in the top of the channel 144 such that the connector 123*a* is presented at an angle. The angle is selected so that the female receptacles of the connector 123*a* are aligned with the pins of the connector 123*b* as the top box assembly 113 is moved into the closed position. The spring 140 compresses as the connector 123*a* rotates into vertical alignment with the connector 123*b*. This arrangements prevents the pins of the connector 123*b* from bending or snapping as the connectors 123*a,b* are brought into mating contact as the top box assembly 113 is moved into the closed position. FIG. 5*b* shows a front perspective view of the base plate 119 with the connector assembly 138 installed.

Turning now to FIG. 6*a*, a side view of the gaming machine 100 is shown with the top box assembly 113 in an installed, full upright position. The top box assembly 113 of the gaming machine 100 of FIG. 6*a* is tilted to the full upright (closed) position such that the base plate 119 opposes the top box plate 118. Also shown is the retractable support member 130 having an extension member 132 in a partially extended position relative to the top box assembly 113. The retractable support member 130 can be secured to the top box assembly 113 to prevent tilting (rotation) of the bop box assembly 113 when the gaming machine 100 is in operation. As shown in FIG. 4, the retractable support member 130 is shown with the extension member 132 retracted within the support member 130, allowing unimpeded access by the operator to the area between the top box plate 118 and the base plate 119. The retractable extension member 132 also avoids risk of injury and facilitates packaging and transportation of the gaming machine to the installation site.

Figure 6B:
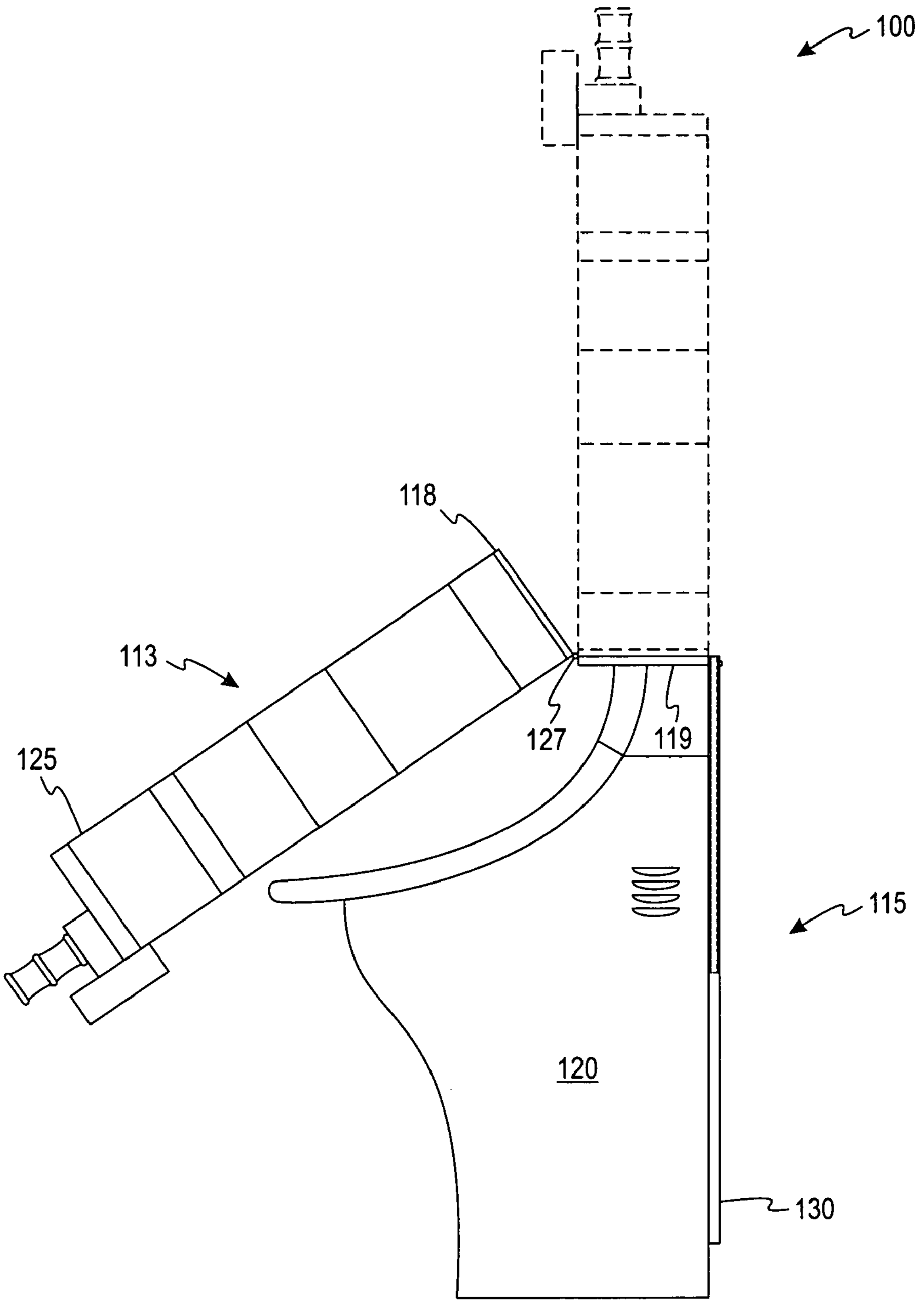
FIG. 6*b* is a side view of the slant-top gaming machine of FIG. 5*a*, with the top box assembly tilted to a full down (open) position.

FIG. 6*b* shows the gaming machine 100 of FIG. 6*a* with its top box assembly 113 tilted in a full down position. The gaming machine 100 may transported partially assembled in this full down position, where the top box assembly 113 lies over the primary display of the base assembly 115. Thus, when the gaming machine 100 is delivered to the installation site, only one operator is needed to tilt the top box assembly 113 into the full upright position (shown in FIG. 6*a*) and to secure the top box assembly 113 to the base assembly 115 using the retractable support member 130.

The present invention significantly reduces the labor costs associated with on-site installation of top boxes. Moreover, the hinged top-box configuration of the present invention significantly reduces the risk of injury to the operator by eliminating the possibility of dropping the heavy top box and obviating the need to lift the heavy top box into place on top of the base, an exercise which often required two or more operators. Further, as mentioned earlier, the operators need not make any manual connections because the respective connectors in the top box assembly 113 and the base assembly 115 are connected by simply tilting the top box assembly 113 into a full upright position relative to the base assembly 115. Still another advantage to the present invention is that the operator does not have to manually match up the top-box serial number to the game-base serial number. In prior configurations, the top-box and base units shipped separately, and the operators had to manually match up serial numbers to ensure that the correct top box was being installed on a base game. The possibility for confusion or error in this endeavor is completely eliminated by the present invention. Finally, the present invention leaves no room for doubt or ambiguity as to whether a top box must be installed on a base game. In accordance with the present invention, the gaming machine arrives at the installation site with the top box already hingedly attached to the base, removing another exercise from the operator's installation process.

The top box assembly 113 is heavy, and when it is rotated to the full full down (open) position, its position may not be optimal for facilitating theme changes or conversions or replacing or servicing parts or software in the top box. It would therefore be desirable to hold the top box assembly 113 in a fixed position that is intermediate the full upright (closed) and full down (open) positions. FIGS. 7*a*-7*f* illustrate the gaming machine 100 adapted to include a bracket assembly 158 that holds the top box assembly 113 in one of a plurality of fixed positions intermediate the closed and open positions, according to an embodiment of the present invention. The bracket assembly 158 includes a stop bracket 160 (front and side views shown in FIGS. 7*b* and 7*c*, respectively), a pull pin 162, and a stop plate 164 (FIG. 7*f*). The pull pin 162 is spring-loaded such that it normally remains flush against the stop bracket 160 until the pin is pulled to retract it away from the stop bracket 160.

Figure 7A:
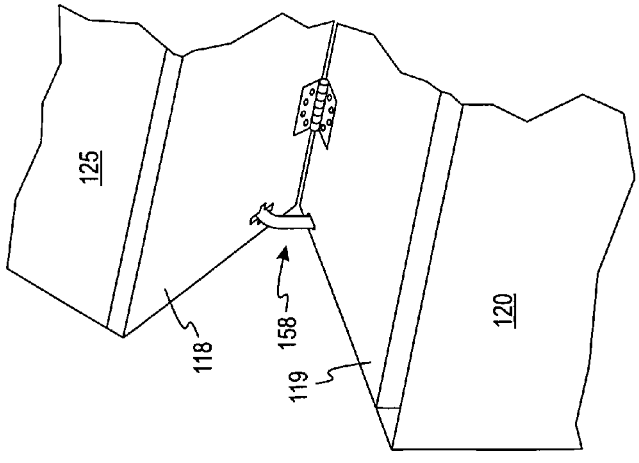
FIG. 7*a* is a perspective view of a portion of a top box assembly mounted to a base assembly with a bracket assembly to hold the top box assembly in an intermediate position between full open and full closed positions, according to an embodiment of the present invention.
Figure 7B:
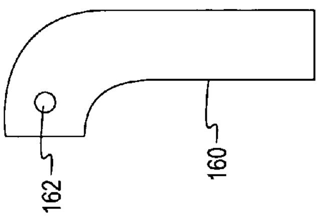
FIG. 7*b* is a front view of a hinge member with a pull pin used in the bracket assembly shown in FIG. 7*a*.
Figure 7C:
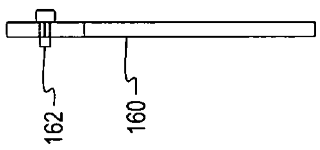
FIG. 7*c* is a side view of the hinge member shown in FIG. 7*b*.
Figure 7D:
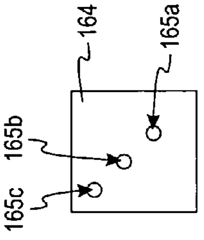
FIG. 7*d* is a front view of a stop plate used in the bracket assembly.
Figure 7E:
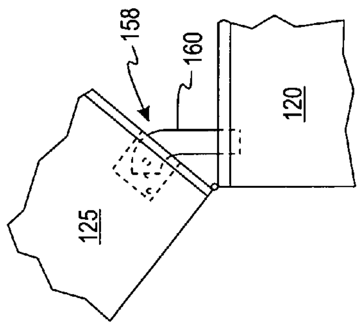
FIG. 7*e* is a side cutaway view of the bracket assembly installed in a gaming machine holding the top box assembly in an intermediate position relative to the base assembly.
Figure 7F:
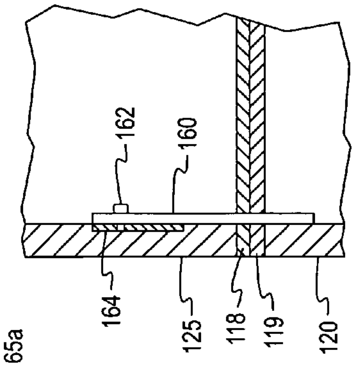
FIG. 7*f* is a front cutaway view of the bracket assembly shown in FIG. 7*e*.

The bracket assembly 158 is attached somewhere within the base assembly 115, such as by screws, as shown in FIG. 7*e* through an aperture formed in the base plate 119. The top portion of the stop bracket 160 of the bracket assembly 158 extends through a corresponding aperture formed in the top box plate 118. The profile of the stop bracket 160 is curved to follow the rotational path as the top box assembly 113 is moved between open and closed positions relative to the base assembly 115. A stop plate 164 is attached to an inner part of the top box housing 125. The stop plate 164 includes one or more holes or detents 165 formed on the surface of the stop plate 164 that are formed along the rotational path of the top box assembly 113. The pull pin 162 extends into one of the holes or detents 165 as the top box assembly 113 is rotated between open and closed positions. For example, if the pull pin 162 stops in hole or detent 165*a*, the operator pulls on the pull pin 162 while continuing to rotate the top box assembly 113 until the pull pin 162 stops in hole or detent 165*b* or 165*c*. To release the top box assembly 113 from the bracket assembly 158, the pull pin 162 can be retracted to allow the stop bracket 160 to exit the aperture formed in the top box plate 118. The stop bracket 160 can then be retracted or rotated into the base assembly 119, such as for shipping, so as not to protrude out of the base assembly 119 when the top box assembly 113 is in the full open position.

In other embodiments, the bracket assembly 158 is mounted to the outside of the housing of the gaming machine 100. A corresponding bracket assembly can be mounted on the side opposite the bracket assembly 158, depending upon the weight and center of gravity of the top box assembly 113. Although a particular arrangement has been shown in FIGS. 7*a*-7*f*, the present invention contemplates other arrangements. For example, one or more chains or other suitable devices (such as one or more wires or the like) can be fastened somewhere within the base assembly 115 and removably secured somewhere within the top box assembly 113. The chain is dimensioned and positioned to stop the top box assembly 113 from moving into a full down position. Hooks or other devices in the top box assembly 113 can permit the top box assembly 113 to be fixed in one or more intermediate positions between the full open and full closed positions.

Figure 8A:
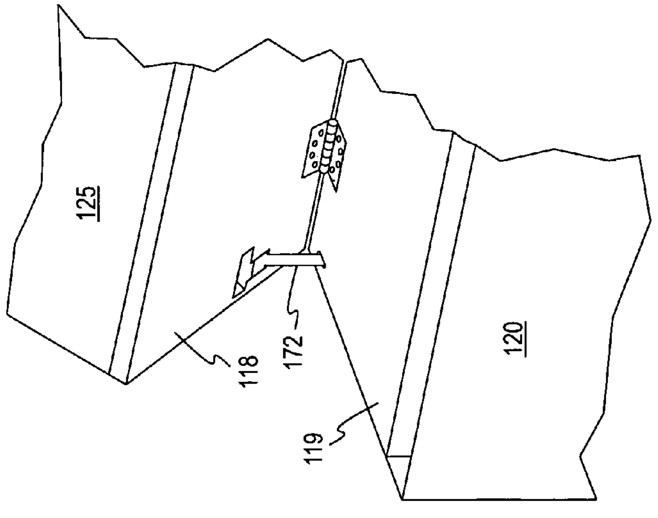
FIG. 8*a* is a perspective view of a portion of a top box assembly mounted to a base assembly with a bar assembly to hold the top box assembly in an intermediate position between full open and full closed positions, according to another embodiment of the present invention.
Figure 8B:
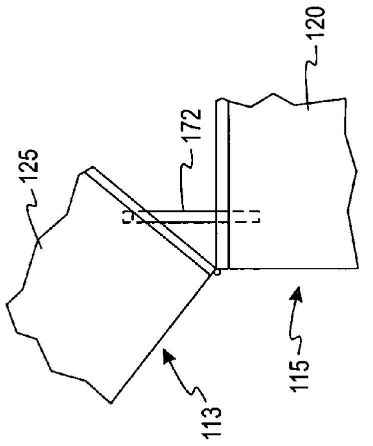
FIG. 8*b* is a side view of the bar assembly shown in FIG. 8*a*.
Figure 8C:
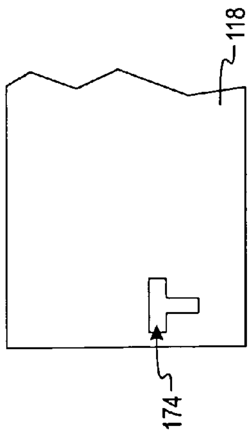
FIG. 8*c* is a front view of a top box assembly having an aperture to receive the stop bar shown in FIG. 8*a*.

Instead of forming holes or detents on a stop plate, a T-shaped aperture 174 is formed in the top box plate 118 as shown in FIGS. 8*a*-8*c*, according to another embodiment of the present invention. The gaming machine 100 is adapted to include a T-shaped stop bar 172, the bottom portion of which is secured somewhere within the base assembly 115 through an aperture formed in the base plate 119, and the top portion of which is received through the T-shaped aperture 174, shown in FIG. 8*c*, in the top box plate 118. The stop bar 172 holds the top box assembly 113, which by virtue of the force of gravity wants to keep rotating to the down position, in an intermediate fixed position between the open and closed positions to facilitate theme conversions or component/software servicing of the top box assembly (see FIGS. 8*a* and 8*b*). To position the top box assembly 113 in the full down (open) position, the operator tilts the top box assembly 113 slightly toward the closed position until the horizontal part of the stop bar 172 aligns with the horizontal part of the aperture 174, permitting the stop bar 172 to exit the aperture 174. Alternately or additionally, the operator bends the stop bar 172, which is preferably made of spring steel, until the horizontal elements of the stop bar 172 and aperture 174 are aligned.

Figure 9B:
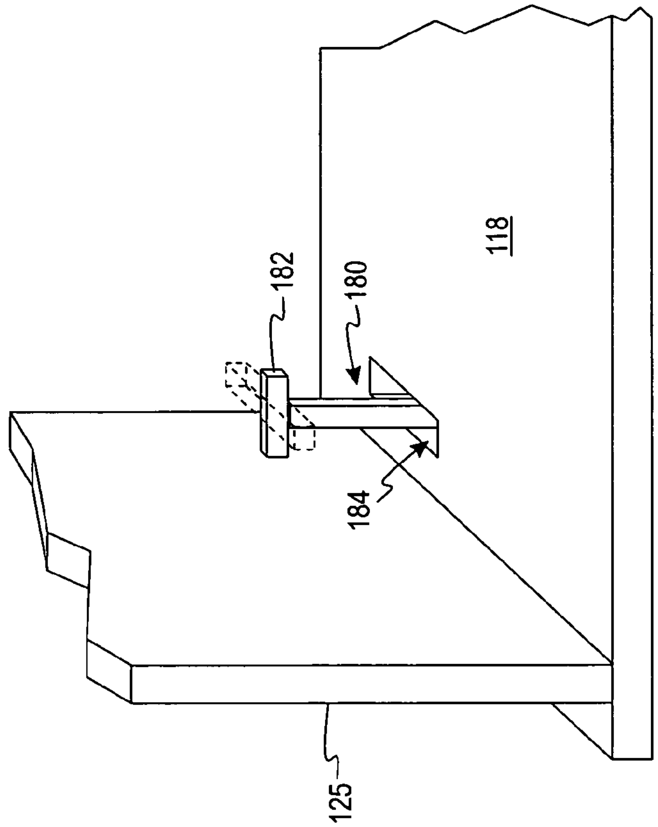
FIG. 9*b* is a perspective view of a portion of a top box assembly shown in FIG. 9*a* with the twist bar assembly extending through an aperture into the top box area of the gaming machine.
Figure 9A:
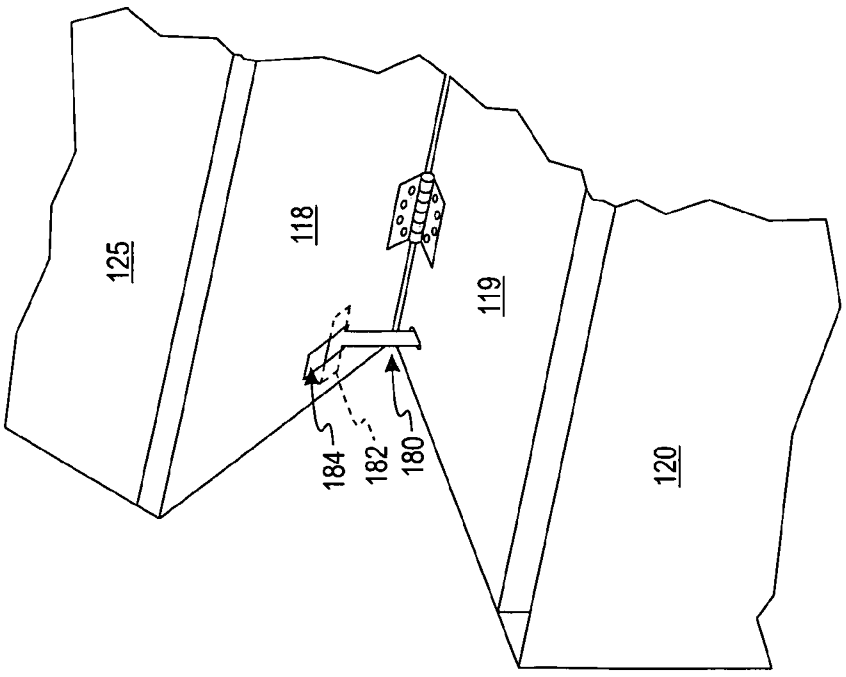
FIG. 9*a* is a perspective view of a portion of a top box assembly mounted to a base assembly with a twist bar assembly to hold the top box assembly in an intermediate position between full open and full closed positions, according to still another embodiment of the present invention.

In FIGS. 9*a*-9*c*, the gaming machine 100 is adapted to include a stop bar 180 having a top bar 182, which extends through an aperture in the base plate 119 and into a vertically oriented aperture 184 in the top box plate 118, according to still an other embodiment of the present invention. Although only a portion of the top box assembly 113 and base assembly 115 are shown in FIGS. 9*a*-9*c*, in other embodiments, a second stop bar is installed near the opposite side (not shown) of the gaming machine. The stop bar 180 is rotatably coupled to the top bar 182 that twists or rotates about the stop bar 180. The top bar 182 has at least two detent positions, 90 degrees apart, to allow the top bar 182 to be rotated between horizontal and vertical positions. In the horizontal position, shown in FIG. 9*a*, the top bar 182 holds the top box assembly 113 in a fixed position relative to the base assembly 115. The weight of the top box assembly 113 along with the tendency of the top box assembly to continue rotating under the force of gravity toward the full open position, holds the top box assembly 113 in tension against the top bar 182. The end opposite the top bar 182 of the stop bar 180 is secured somewhere within the interior of the base assembly 115. The stop bar 180 and top bar 182 can be retracted into the base assembly 115 when not in use, such as during transportation of the gaming machine 100.

To release the top box assembly 113 from the stop bar 180 and top bar 182, the operator twists or rotates the top bar 182 from the horizontal to a vertical position such that the top bar 182 is aligned with the vertical aperture 184 formed in the top box plate 118. When aligned, the top bar 182 can exit the vertical aperture 184, allowing the top box assembly 113 to be rotated into the full down (open) position.

Each of these embodiments and obvious variations thereof is contemplated as falling within the spirit and scope of the claimed invention, which is set forth in the following claims.

What is claimed is:

1. A gaming machine comprising:

a base assembly including a cabinet and a primary display housed within said cabinet, said primary display displaying a wagering game in response to receiving a wager from a player of said gaming machine, said cabinet having a front from which said primary display is viewable; and a top box assembly including a top box display, said top box assembly being pivotally attached to said base assembly, wherein said top box assembly is pivotable from a closed position to an open position in a direction toward said front, and wherein said top box assembly extends beyond a frontmost portion of said front while said top box assembly is in said open position, wherein said movement causes an electrical connection between said top box assembly and said base assembly to be established when said top box assembly is in said closed position and to be broken as said top box assembly is urged toward said open position, wherein said top box assembly is movable in fixed stops about at least one hinge relative to said base assembly among a plurality of positions, including said open position, said closed position, and a third position.

2. The gaming machine of claim 1, further including a controller for executing instructions associated with said wagering game, wherein said primary display displays said wagering game in response to receiving a wager from a player of said gaming machine.

3. The gaming machine of claim 2, wherein said top box assembly is pivotable in fixed stops along a radial path relative to said base assembly among said plurality of positions, including said open position, said closed position, and said third position, said top box assembly remaining attached to said base assembly in said open position, said closed position, and said third position, and wherein said primary display is a video display.

4. The gaming machine of claim 3, further comprising:

said at least one hinge coupled between said top box assembly and said base assembly, wherein said base assembly includes a base plate and said top box assembly includes a top box plate, said at least one hinge being attached between said base plate and said top box plate; wherein said base assembly further includes said first electrical connector assembly and said top box assembly further includes said second electrical connector, said first electrical connector assembly matingly engaging said second electrical connector when said top box assembly is in said closed position, said first electrical connector assembly including a connector and a spring adapted to present said connector at an angle relative to said second electrical connector when said top box assembly is in said open position, said connector rotating into vertical alignment with said second electrical connector as said top box assembly is urged toward said closed position.

5. The gaming machine of claim 1, wherein said primary display is a slant-top display.

6. The gaming machine of claim 1, further comprising at least one hinge coupled between said top box assembly and said base assembly, wherein said base assembly includes a base plate and said top box assembly includes a top box plate, said at least one hinge being attached between said base plate and said top box plate.

7. The gaming machine of claim 6, wherein said base plate is dimensioned so as to permit at least about 90 degrees of rotation about said at least one hinge by said top box assembly relative to said base assembly.

8. The gaming machine of claim 1 where said first electrical connector and second electrical connector are blind-mate connectors.

9. The gaming machine of claim 1, further comprising a retractable support assembly attached to a rear portion of said base assembly, said retractable support assembly having a retractable member that is retractably extendable relative to said top box assembly.

10. The gaming machine of claim 1, wherein said primary display is a video display.

11. The gaming machine of claim 1, wherein said open position is a fully open position.

12. The gaming machine of claim 1, further comprising means for holding said top box assembly is in said third position.

13. A gaming machine, comprising:

a base including a first electrical connector and a cabinet housing a first display for displaying a wagering game in response to receiving a wager from a player of said gaming machine, said cabinet having a front from which said first display is viewable by said player;

a top box including a second display and a second electrical connector positioned to engage said first electrical connector; and at least one hinge coupled between said base and said top box and rotatable among a plurality of positions including a closed position and an open position, wherein said top box is rotatable from said closed position to said open position in a direction toward said front, and wherein said top box extends beyond a frontmost portion of said front while said top box is in said open position and, wherein said top box assembly is movable in fixed stops about said at least one hinge relative to said base assembly among a plurality of positions, including said open position, said closed position, and a third position.

14. The gaming machine of claim 13, wherein said base includes a first connector and said top box includes a second connector, said first connector and said second connector being positioned so as to be matingly engaged in a first one of said plurality of positions and electrically disengaged from one another in a second one of said plurality of positions.

15. The gaming machine of claim 13, further comprising a retractable support assembly attached to a rear portion of said base, said retractable support assembly having a retractable member that is retractably extendable relative to said top box.

16. A method of installing a top box assembly of a gaming machine comprising:

providing a base assembly that includes a first electrical connector and a cabinet that houses a primary display for displaying a wagering game in response to receiving a wager from a player, said cabinet having a front from which said primary display is viewable, said top box assembly being in an open position and extending beyond a front most portion of said front of said cabinet rotating said top box assembly that extends beyond said front most portion relative to said base assembly in a first direction toward said front from said open position toward a closed position, said top box assembly including a second electrical connector that engages said first electrical connector when said top box assembly is in said closed position to establish an electrical connection between said first electrical connector in said base assembly and said second electrical connector in said top box assembly and stopping rotating when said top box assembly is in said open position; and holding said top box assembly relative to said base assembly in at least one fixed position between said open position and said closed position about said at least one hinge.

17. The method of claim 15, further comprising rotating in a direction opposite said first direction said top box assembly relative to said base assembly such that said first electrical connector in said base assembly breaks said electrical connection with said second electrical connector in said top box assembly.

18. The method of claim 16, further comprising:

extending a retractable support member attached to said base assembly; and securing said retractable support member to said top box assembly in said closed position in which said electrical connection is established.

* * * * *